Jan. 6, 1953  W. H. GELLES ET AL  2,624,618

STEAM CLEANING APPARATUS

Filed Feb. 24, 1949

INVENTORS
WILLIAM H. GELLES
JACOB PRESTON MILLER
BY

Patented Jan. 6, 1953

2,624,618

UNITED STATES PATENT OFFICE 2,624,618

STEAM CLEANING APPARATUS

William H. Gelles, New York, N. Y., and Jacob Preston Miller, Glen Rock, N. J., assignors to Autocraft Mfg. Corp., New York, N. Y., a corporation of New York Application February 24, 1949, Serial No. 78,144

7 Claims. (Cl. 299—84)

The present invention relates to a steam cleaning apparatus and in particular to a steam cleaning apparatus designed for cleaning of building and other surfaces, as well as to a method of cleaning such surfaces.

The use of steam as an agent for removing grease, dirt and other accumulations from the surfaces of buildings and other surfaces is known. Yet, the apparatus used heretofore for this purpose is subject to objections, since either the detergent or cleaning fluid had to pass through the steam generator or separate conduits were provided for steam and cleaning fluid before joining at the place of the application, or generation and admixture of bodies of steam of two different temperatures and pressures were provided.

It is, therefore, one of the objects of the present invention to provide an improved steam cleaning apparatus which comprises a steam generator and a tank for the cleaning fluid fed with hot water from the steam generator.

It is another object of the present invention to provide an improved steam cleaning apparatus which is equipped with a mixing chamber in which steam and cleaning fluid are mixed, whereby the latter is fed into the chamber by Venturi effect.

It is still another object of the present invention to provide a steam cleaning apparatus which has means for controlling the flow of cleaning fluid into a chamber mixing the latter with steam.

It is yet another object of the present invention to provide a steam cleaning apparatus having a steam generator which comprises a vertically disposed center conduit surrounded by a plurality of vertically disposed coils in parallel arrangement to said center conduit, the latter providing hot water feed for the tank containing the cleaning fluid.

It is a further object of the present invention to provide an improved method of cleaning surfaces by mixing steam with a cleaning fluid, the latter being atomized at the time of mixing.

Figure 1:
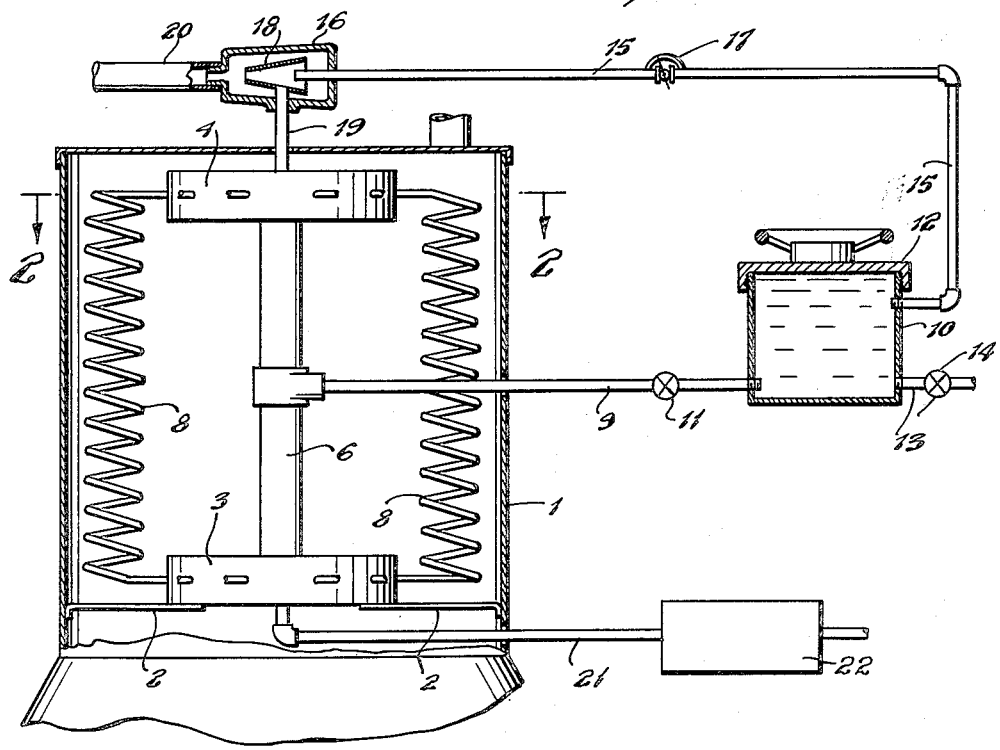
Figure 2:
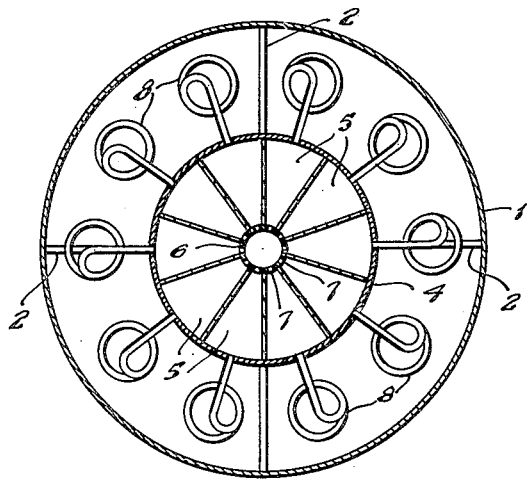

With these and other objects in view which will become apparent in the following detailed description, the present invention will be clearly understood in connection with the accompanying drawing, in which:

Figure 1 is a vertical sectional view of the cleaning apparatus in accordance with the present invention; and, Fig. 2 is a section of the steam generator along the lines 2—2 of Fig. 1.

Referring now to the drawing the apparatus comprises a jacket 1 into which terminates any suitable heating means (not shown). Brackets 2, welded, riveted, screwed or otherwise secured to the jacket 1, support the steam generator unit. The latter consists of a lower and an upper block 3 and 4 which is, preferably, of cylindrical shape and each of said blocks is divided in a plurality of sections 5. A vertically disposed center conduit 6 connects the said two blocks 3 and 4. In addition each section 5 of the two blocks is connected with the center conduit 6 by means of openings 7 in the latter. Furthermore, a plurality of coils 8 surround the center conduit 6 and connect each section 5 of the lower block 3 with a corresponding section of the upper block 4. These coils 8 may be arranged with a plurality of windings which will be sufficient to generate steam.

The conduit 6 is equipped, preferably at its center, with a T-piece which receives one end of a conduit 9 the other end of which terminates in a tank 10 adjacent its bottom which tank receives the cleaning fluid, namely soap or any other suitable chemical compound known to the man skilled in the art. The conduit 9 is equipped with a shut-off valve 11 which disconnects the tank 10 from the steam generator, if required. A cover 12 closes the tank 10 in such manner that comparatively high pressure can be applied to the tank 10.

An outlet pipe 13 equipped with a shut-off valve 14 is arranged close to the bottom of the tank 10 in order to remove any fluid before cleaning the tank 10. Another conduit 15 exits from the tank 10 close to its upper margin and leads into a chamber 16. The conduit 15 is equipped with a meter-valve 17 which is adapted to control the flow of cleaning fluid dissolved in hot water into the chamber 16.

The end of the conduit 15 leads into the wider end of a discharge nozzle 18 disposed in the chamber 16 and connected with the center of the upper block 4 by means of a conduit 19.

The front of the chamber 16 is formed to receive a hose 20 or the like which leads to the place to be cleaned, to feed the mixture of steam, into which the cleaning fluid has been atomized, thereto.

The feed of cold water to the steam generating unit is achieved by means of the conduit 21 which terminates in the center of the lower block 3 and is either connected with a water pump 22 (shown schematically in Fig. 1) or any other water source under pressure. A flue (not shown) may be connected to the top of the jacket 1 in order to remove the hot gases striking over the coils 8 of the steam generating unit.

The operation of the apparatus, as described above, takes place in the following manner:

Cold water enters the steam generating unit through the conduit 21 and at first into the lower block 3 wherefrom the water stream is divided. One portion flows through the center conduit 6 towards the upper block 4, while other portions are divided into a plurality of streams. In the drawing are by example 10 sections 5 in the lower and upper block 3 and 4, respectively, provided and correspondingly ten coils 8 are arranged which feed in ten separate streams the water upwards from the lower block 3. While in the coils the water is heated rapidly and transformed into steam so that the upper block 4 contains steam under comparatively high pressure, the conduit 19 leads the steam under pressure into the nozzle 18 disposed in the mixing chamber 16 where it is fed to the hose 20.

Hot water is fed at the same time from the center conduit 6 to the tank 10 where a suitable cleaning fluid had been previously deposited. The hot water dissolves the cleaning fluid in the tank 10 and a cleaning solution is fed through the conduit 15 to the chamber 16 and into the nozzle 18 where the liquid will be atomized due to the Venturi effect in the chamber 16 and the liquid particles mixed with steam entering through the conduit 19, as described above, are fed to the hose 20 and thereby to the place where the cleaning fluid is applied. The meter-valve 17 controls the flow of the cleaning fluid solution which thus can be mixed in varied amounts with the steam. In cases where no cleaning fluid, but steam only is required, the valve 11 disconnects the tank 10 from the steam generating unit and no cleaning fluid will be fed to the chamber 16. In addition the meter-valve 17 may also be closed, thereby disconnecting completely the tank 10. It is also possible to clean the tank 10 by closing the valve 14 of the outlet conduit 13.

While I have disclosed one embodiment of the present invention it is to be understood that this embodiment is given by example only and not in a limiting sense, the scope of the present invention being determined by the objects and the claims.

We claim:

1. In an apparatus for cleaning surfaces, a water source, a steam generating unit, means for feeding water under pressure to the bottom of said steam generating unit, a tank receiving cleaning fluid, an ejector unit, connecting means between the outlet of the steam generating unit and inlet of the said ejector unit for feeding steam into the ejector unit, said outlet of the said steam generating unit being disposed at its top, connecting means between a hot water outlet from the steam generating unit and inlet of said fluid tank for feeding hot water from said steam generating unit to said tank, said inlet of said fluid tank being disposed at its bottom, and connecting means from the outlet of said tank to a second inlet of said ejector unit for feeding fluid solution from said tank to said ejector unit to be atomized and mixed with steam in the latter unit, said outlet of said fluid tank being disposed at its top.

2. The apparatus as set forth in claim 1, which includes means for controlling the flow of the fluid solvent from said tank to said ejector unit.

3. The apparatus, as set forth in claim 1, which includes means for cutting-off the flow of hot water from the steam generating unit to said tank.

4. In an apparatus for cleaning surfaces, a water source, a steam generating unit, means for feeding water from said water source under pressure to said steam generating unit, the latter comprising an upper and a lower block members, each said block members being divided into a plurality of sections, a first conduit means between said lower and upper block, a coil member connecting each section of the lower block member with a corresponding section of said upper block member, and means connecting each section with said first conduit means, a tank receiving cleaning fluid, an ejector unit, connecting means between the outlet of the steam generating unit and inlet of the said ejector unit for feeding steam into the ejector unit, connecting means between a hot water outlet from said first conduit means and inlet of said fluid tank for feeding hot water from said steam generating unit to said tank, said inlet of said fluid tank being disposed at its bottom, and connecting means from the outlet of said tank to a second inlet of said ejector unit for feeding fluid solution from said tank to said ejector unit to be atomized and mixed with steam in the latter unit, said outlet of said fluid tank being disposed at its top.

5. In a method of cleaning surfaces, the steps of heating up water and generating steam of predetermined pressure, feeding one portion of said hot water to a cleaning fluid in upward direction contrary to the gravity flow of the latter, solving the cleaning fluid in said one portion of hot water, feeding the solution to a common point with said generated steam, atomizing said solution, mixing the latter with said steam and finally spraying the mixture upon the work to be cleaned.

6. A continuous method of cleaning surfaces comprising the steps of continuously heating up water and continuously generating steam of predetermined pressure, dividing the hot water stream into two line streams, the first line to be generated to steam and the second line to be fed continuously to a cleaning fluid in upward direction contrary to the gravity flow of the latter, solving the cleaning fluid in said second line, feeding the solution to a common point with said generated steam, atomizing said solution, mixing the latter with said steam and finally spraying the mixture upon the work to be cleaned.

7. The method, as set forth in claim 6, in which the said step of continuously heating up water is performed in a plurality of parallel independent streams of water.

WILLIAM H. GELLES.
JACOB PRESTON MILLER.

REFERENCES CITED

The following references are of record in the file of this patent:

UNITED STATES PATENTS

| Number | Name | Date |
|---|---|---|
| 1,766,088 | Wier | June 24, 1930 |
| 1,878,560 | Wier | Sept. 20, 1932 |
| 2,015,296 | Swan | Sept. 28, 1935 |
| 2,044,557 | Alvord | June 16, 1936 |
| 2,128,263 | Ofeldt | Aug. 30, 1938 |
| 2,345,614 | Malsbary et al. | Apr. 4, 1944 |